July 3, 1956     D. I. KUYKENDALL     2,753,441
ELECTRICALLY ILLUMINATED WREATH FOR AUTOMOBILE WINDOWS
Filed March 27, 1953
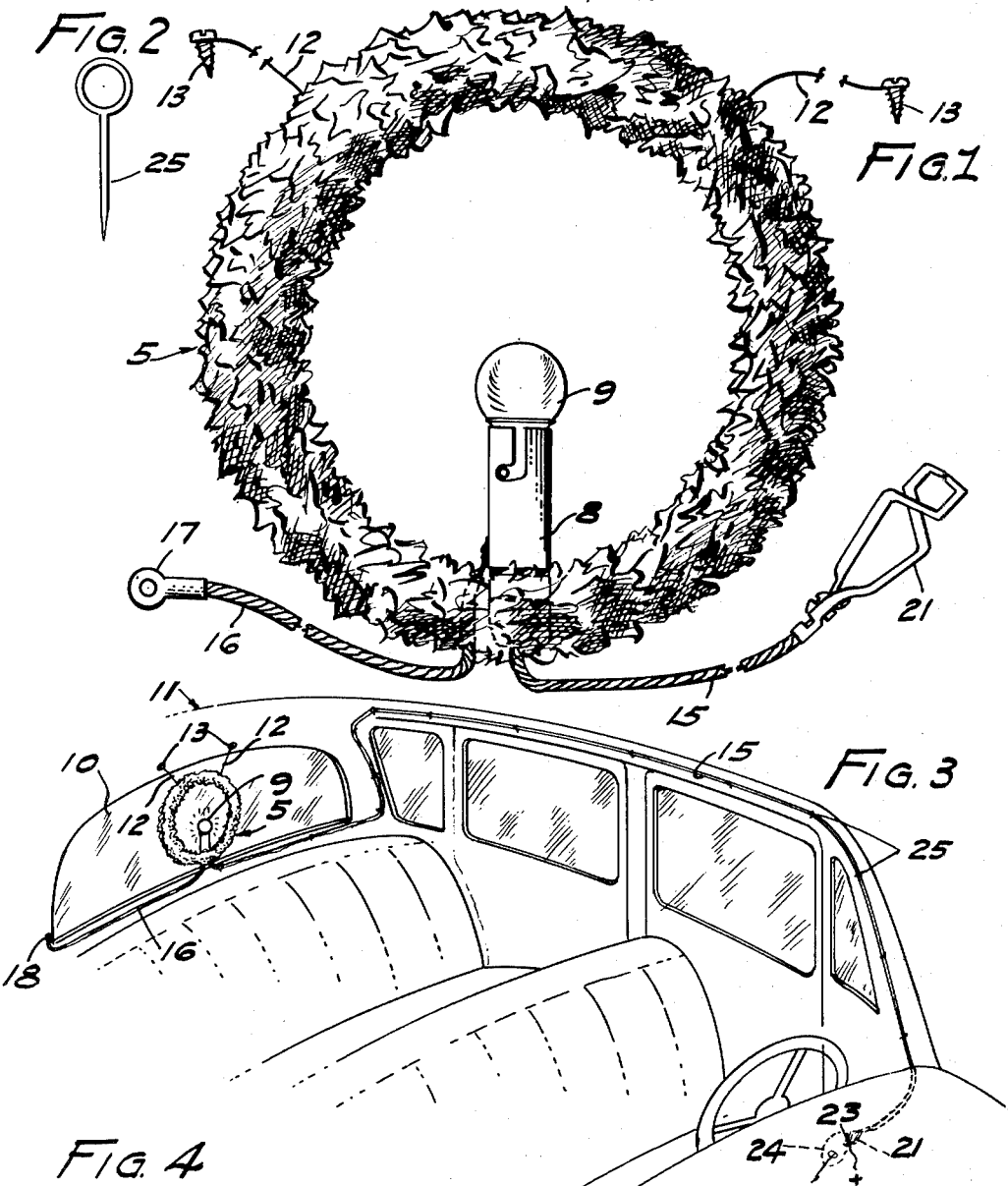
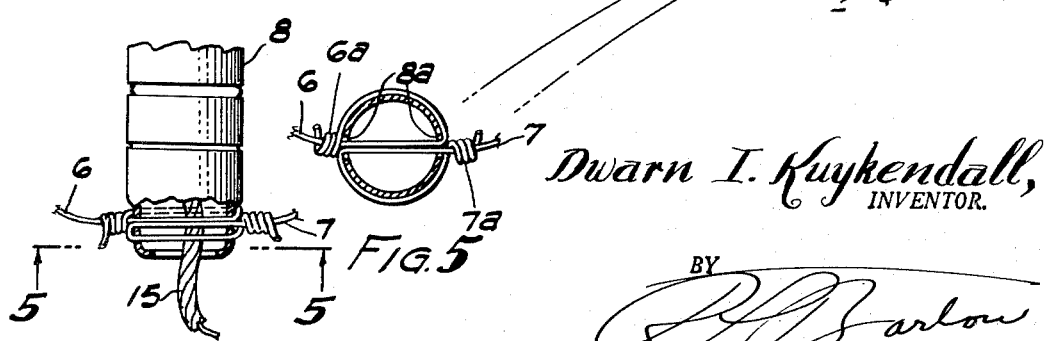
Dwarn I. Kuykendall,
INVENTOR.
BY
ATTORNEY

United States Patent Office 2,753,441
Patented July 3, 1956

2,753,441

ELECTRICALLY ILLUMINATED WREATH FOR AUTOMOBILE WINDOWS

Dwarn I. Kuykendall, Watts, Calif.

Application March 27, 1953, Serial No. 344,995

3 Claims. (Cl. 240—10)

This invention relates to an electrically illuminated wreath for an automobile window and more particularly to a wreath typifying the Christmas spirit.

Although illuminated wreaths mountable in the glass portions of windows and doors of homes and mercantile establishments are not broadly new in the art to which this invention pertains, yet an investigation of the prior art indicates that, thus far no means has been devised for displaying an electrically illuminated wreath upon an automobile window in a stable attractive manner, during the holiday season to which Christmas pertains.

An important object of the invention is to provide an improved means for visibly mounting the wreath in an automobile window, in conjunction with improved means for supporting, adjacent to the wreath an electric illuminating lamp electrically connected with the automobile's lighting system.

A more specific object of the invention is to provide an improved wire support about which the wreath is formed, a part of which is utilized to support, in an improved manner, an electric lamp positioned to illuminate the wreath.

Still another specific object is to provide, in conjunction with the wiring for the lamp, improved upholstery supported means for the cordage which conveys the current from the conventional wiring of the automobile to the aforesaid lamp.

A still further object is to awaken in the minds of the traveling public the thought of Christmas buying and to open up a new field of manufacturing endeavor to provide more extensive work for the people now employed in this field of research.

Other objects, advantages and features of invention will hereinafter appear.

Referring to the accompanying drawing, illustrative of a preferred embodiment of the invention, as now reduced to practice, Fig. 1 is a front elevation of the wreath, lamp and conductive cordage, portions of the latter being broken out to contract the view.

Fig. 2 is an enlarged side elevation of one of the eyeletted pins used to attach the conductor cordage to the upholstery of the vehicle.

Fig. 3 is a perspective view of the interior of an automobile showing, on a smaller scale, the device mounted on rear window of the car. In this view the conducting cordage is shown in its operative position with the positive and negative poles indicated.

Fig. 4 is an enlarged fragmentary, view showing a fragment of the lamp casing a portion of which is sectioned better to illustrate its structure.

Fig. 5 is a horizontal section looking up from line 5—5 of Fig. 4, the current conducting cable being omitted.

Referring in detail to the drawing, the illuminated wreath structure shown comprises an annular wreath body 5, attached to and extending around which is a reinforcing wire having end portions 6 and 7 shown in Figs. 4 and 5. The tubular shank portion 8 of the lamp bulb 9 has two diametrically opposite apertures 8a through its lower end portion. The wire end portion 6 of the lamp supporting wire means is fed through both of said apertures and then, after being looped around one side of the lamp shank, is coiled around itself as shown at 6a. Likewise the wire end portion 7 is led through said apertures and is then, after being looped around the opposite side portion of the lamp shank, coiled about itself at 7a. The lamp is thus securely attached to the wreath.

Said wreath body 5 is supported in an overlying relation to the rear window 10 of the automobile body 11 by means of a pair of cords 12 which are connected by screws 13 to the car.

In order to include the aforesaid lamp 9 in the lighting circuit of the vehicle, a positive wire 15 and a negative wire 16 are electrically connected therewith, said negative wire 16 carrying an apertured terminal 17 designed to have passed through it a suitable grounding screw 18 and said positive wire 15 is shown connected to a resilient clamping clip 21 designed to be sprung onto the live terminal 23 of the cowl lamp 24.

In Fig. 2 is shown one of the eyeletted fasteners 25 used to hold in place the cord 15, which passes through the eyes of said fasteners whereby said cord is attached to the upholstery of the car.

It will be observed that the upwardly diverging connections 12, extending from opposite sides of the center of the top portion of the wreath together with the lamp 9, located at the lower midwidth portion of said wreath, contribute toward producing a balanced, well supported structure.

When it is desired to illuminate the wreath it is only necessary to turn on the conventional light switch of the automobile, which operation will not only energize the lights of the car but will cause the aforesaid lamp 9 to illuminate the wreath.

It is to be understood that the form of the invention herein shown and described is to be taken as an illustrative example thereof and that changes as to the shape, size and arrangement of parts can be resorted to without departing from the spirit of the invention or the scope of the subjoined claims.

I claim:

1. A wreath adapted to be mounted in the window of an automobile, said wreath comprising an annular wreath body, a reinforcing wire extending around said wreath body and having a pair of ends adjacent the bottom thereof, an electric light socket having a bulb receiving portion, a pair of electric terminals and a base, said base having a pair of oppositely disposed apertures, the ends of said wire extending through said apertures in opposite directions, one of said ends being wound around one half of said base and then being twisted around itself, the other of said ends being wound around the other half of said base, and then being twisted around itself to attach said wreath body to said base so that said socket extends diametrically upwardly from the bottom of said wreath body into the open center thereof, the bulb receiving portion of said socket adapted to hold an electric light bulb adjacent the center of said annular wreath body, a short wire connected at one end to one of the terminals of said socket, the other end of said short wire being connected to a grounded portion of the automobile, a longer wire connected at one end to the other terminal of said socket, the other end of said longer wire being connected to the switch of the automobile, and a pair of cords extending diagonally upwardly and outwardly from the sides of said wreath body adjacent the top thereof, said cords adapted to be connected to the body of the automobile above the window to mount said wreath body so that it overlies said window to provide an electrically illuminated wreath visible from outside said automobile.

2. A wreath adapted to be mounted in the window of an automobile, said wreath comprising an annular wreath body, a reinforcing wire extending around said wreath body and having a pair of ends adjacent the bottom thereof, an electric light socket having a bulb receiving portion, a pair of electric terminals and a base, said base having a pair of oppositely disposed apertures, the ends of said wire extending through said apertures in opposite directions, one of said ends being wound around one half of said base and then being twisted around itself, the other of said ends being wound around the other half of said base and then being twisted around itself to attach said wreath body to said base so that said socket extends diametrically upwardly from the bottom of said wreath body into the open center thereof, the bulb receiving portion of said socket adapted to hold an electric light bulb adjacent the center of said annular wreath body, means for connecting the electric terminals of said socket to a source of electrical supply within the automobile and means for suspending said wreath body from above the automobile window, so that it will overlie said window to provide an electrically illuminated wreath visible from the outside of the automobile.

3. A wreath adapted to be mounted in the window of an automobile, said wreath comprising an annular wreath body, a reinforcing wire extending around said wreath body and having a pair of ends adjacent the bottom thereof, an electric light socket having a bulb receiving portion at the top thereof, a pair of eelctric terminals and a base, the ends of said wire extending around said base to attach said wreath body to said base so that said socket extends diametrically upwardly from the bottom of said wreath body into the open center thereof, the bulb receiving portion of said wreath adapted to hold an electric light bulb adjacent the center of said wreath body, means for connecting the electric terminals of said socket to a source of electrical supply within the automobile and means for suspending said wreath body from above the automobile window, so that it will overlie said window to provided an electrically illuminated wreath visible from outside said automobile.

References Cited in the file of this patent

UNITED STATES PATENTS

| | | |
|---|---|---|
| 1,370,674 | Smith | Mar. 8, 1921 |
| 1,371,820 | Sochurek | Mar. 15, 1921 |
| 1,485,089 | Musselman | Feb. 26, 1924 |
| 1,629,425 | Wardhaugh | May 17, 1927 |
| 2,033,173 | Barocas | Mar. 10, 1936 |